Dec. 24, 1963   J. M. CENTA ETAL   3,115,420
COATED FILMS
Filed June 16, 1961
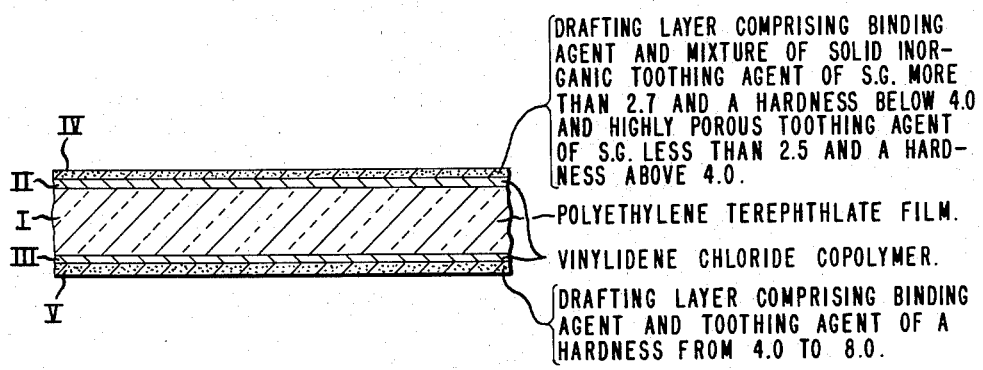
INVENTORS
JOHN M. CENTA
ALBERT L. VAN STAPPEN
LOUIS F. VOGT, JR.
BY *Lynn Barrett Morris*
ATTORNEY United States Patent Office 3,115,420
Patented Dec. 24, 1963

3,115,420
COATED FILMS
John M. Centa, Westfield, Albert L. Van Stappen, Rumson, and Louis F. Vogt, Jr., Westfield, N.J., assignors to E. I. du Pont de Nemours and Company, Wilmington, Del., a corporation of Delaware
Filed June 16, 1961, Ser. No. 117,667
8 Claims. (Cl. 117—68)

This invention relates to flexible dual purpose translucent coated films for drafting purposes. More particularly, the invention relates to such dual purpose drafting films having improved surfaces for use with a wide variety of drafting pens and pencils. The invention also relates to a process for making such drafting films.

It is known to provide drafting materials consisting of cloth and paper on which there are coated layers of transparentizing materials and layers containing abrasive materials. These materials have a number of disadvantages. Paper becomes brittle with age and lacks strength and durability. Thus, it becomes creased and the corners get bent, folded and torn during drafting and in use of the final drawing. Tracing cloth is stronger and it likewise becomes brittle with age. It is also quite difficult to manufacture drafting papers and cloths which have uniform translucency. In most cases, to provide the proper degree of transparency and the right amount of abrasiveness, several costly coatings are required. Usually only one surface of a support is coated to provide a drawing surface and when both surfaces have been coated, the same composition is used. This is generally necessary to avoid curl and non-planarity. This means that the surfaces are either suitable for very hard pencils and too abrasive for soft pencils and drafting pens, or the layer is suitable for soft pencils and drafting pens but is broken through and scratched or scribed by very hard pencils. Drafting films comprising a film base composed of vinyl copolymers, polyesters and polyamides and polyethylene are known. Such films have been coated with various resinous compositions in volatile solvents including acrylic polymers and copolymers and/or heat hardenable phenolic resins containing toothing agents such as silica, kaolin, titanium dioxide, calcium carbonate and magnesium carbonate, etc. The above films offer advantages in tracing materials for drafting purposes, particularly polyester films, e.g., polyethylene terephthalate. Such films are more dimensionally stable than paper or cloth and do not require the application of transparentizing coatings. However, these coatings on films have not been entirely suitable for drafting or tracing surfaces. The main disadvantage is lack of sufficient hardness of these coatings to resist being scratched or scribed by hard pencils, i.e. 6H to 9H grades. Another disadvantage has been that where very dense materials have been used, ink drawings have been a problem because of flaking of the inked lines upon aging and constant use. This is particularly true where very dense compounds such as barium sulfate have been used as the sole toothing agent. Another disadvantage is that the prior art methods of manufacture require that the layers for the drawing surfaces be coated on hydrophobic films from an organic solvent solution. This method of manufacture requires more elaborate coating equipment including expensive solvent recovery systems.

An object of this invention is to provide a thin, flexible, dimensionally stable drafting film having two different drafting layers. Another object is to provide such a film wherein one of the drafting layers is readily receptive to marking with a soft or hard drafting pencil and with India ink, and the other is readily receptive to marking with a very hard drafting pencil. A further object is to provide such a drafting film which can be manufactured by means of conventional photographic coating apparatus and utilizes available materials.

The dual purpose flexible drafting film of this invention, in its broader aspects, comprises (1) a macromolecular organic polymer film from 3 to 10 mils in thickness having on each surface an adherent thin sublayer (e.g., 0.5 to 4.0 mg./dm.$^2$, dry weight) of a hydrophobic organic copolymer, said copolymer coated base film exhibiting a shrinkage of not more than 0.2% when heated to a temperature of 120° C. for a period of 5 minutes, (2) on one sublayer a drafting layer composed of a water-soluble organic polymer of high molecular weight and capable of forming a coherent, hard film having uniformly dispersed therethrough a mixture of finely divided particles of two toothing agents, at least 60% by weight of said particles being one of said agents having a specific gravity greater than 2.7, a hardness below 4.0 and a particle size from 0.1 to 10.0 microns, and at least 10% by weight of the particles being the other agent having a specific gravity less than 2.5, a hardness above 4.0 and a particle size from 0.1 to 10 microns, and (3) on the other sublayer a drafting layer of different characteristics from layer (2) and comprising finely divided particles of one toothing agent having a hardness from 4.0 to about 8.0 and a particle size from about 0.1 to 10.0 microns dispersed in the aforesaid water-soluble organic polymer. The hardness referred to above is that of Mohs' scale.

A preferred dual purpose drafting film of the invention has a polyethylene terephthalate film base, sublayers of a vinylidene chloride/acrylic ester/itaconic acid copolymer containing such components in respective amounts, by weight, of 35% to 96%, 3.5% to 64.5% and 0.5 to 25.0% and drafting layer (2) comprises a mixture of ($x$) a solid inorganic toothing agent having a specific gravity greater than 2.7, e.g., barium sulfate, calcium carbonate, zinc oxide or aluminum oxide and a hardness of less than 4.0, and ($y$) a highly porous inorganic toothing agent having a specific gravity less than 2.5, e.g., highly porous silicon dioxide and highly porous magnesium silicate, agent ($x$) being present in amounts from 60 to 90 parts per 10 to 40 parts, by weight, of agent ($y$).

Polymers suitable as binding agents for the toothing agents include ($a$) a water-soluble, nitrogen-containing formaldehyde resin taken from the group consisting of urea-formaldehyde, thiourea-formaldehyde and melamine-formaldehyde and their cationic-modified, aliphatic mono- and polyamine-modified and guanidine-modified forms. In general, 0.65 to 1.0 part of agent per part, by weight, of binder are used.

Suitable inorganic toothing agents for drafting layer (3) include non-porous silica, highly porous silicon dioxide and highly porous magnesium silicate.

A drafting film, as set forth above, is shown in the accompanying drawing which constitutes a part of this application. In this drawing in an exaggerated cross-section, a polyethylene polyterephthalate film base I has on one surface a layer II of vinylidene chloride copolymer referred to in the preceding description and on the other surface a layer III of the same copolymer. Upon layer II there is coated a drafting layer IV comprising a binding agent and a mixture of a solid inorganic toothing agent having a specific gravity greater than 2.7 and a highly porous inorganic toothing agent having a specific gravity less than 2.5. On layer III there is coated a drafting layer V comprising a binding agent and a toothing agent having a specific gravity less than 2.7, e.g., silica and a hardness from about 4 to about 8 and a particle size from about 0.1 to 10.0 microns.

The drafting layers of the foregoing drafting films can be made by applying to the surface of the hydrophobic copolymer sublayer and aqueous coating solution containing the water-soluble organic polymer binding agent, a plasticizing agent, e.g., 1 to 10% by weight of glycerine or ethylene glycol and 13% to 20% by weight of the toothing agent based on the weight of the water. Small amounts of solvents, e.g., methanol and ethanol, wetting or dispersing agents, and other adjuvants can be present in the coating solution. Any of the conventional devices used for coating photographic emulsion layers can be used.

The invention will be further illustrated by, but is not intended to be limited to, the following examples.

*Example I*

A 4 mil dimensionally stable, biaxially oriented polyethylene terephthalate film base having on each surface thereof a thin layer of a vinylidene chloride/methyl acrylate/itaconic acid copolymer as described in Alles U.S. 2,779,684 was coated on one surface with the water-soluble guanidine-modified urea-formaldehyde resin mixture containing dispersed silica described in Example I of U.S. Patent 2,964,423, issued December 13, 1960. On the other surface there was coated an aqueous dispersion having the following composition.

| | |
|---|---|
| Guanidine-modified urea-formaldehyde (40% aqueous solution)_____grams__ | 16,480 |
| Ethylene glycol_____do____ | 330 |
| Barium sulfate (sp. g. 4.5; hardness of about 3.3; average particle size 2–5 microns)____grams__ | 2120 |
| Highly porous silicon dioxide (sp. g. 2.32; hardness of about 7.0; dry bulk density 10#/ft.$^3$; part. size 5–10 microns)_____grams__ | 1040 |
| Formic acid to adjust pH to 3.0_____do____ | 390 |
| Saponin (10% aqueous)_____do____ | 550 |
| Water to make 45.5% solids_____ml__ | 1780 |

The above mixture was ball milled for 16 hours, diluted to 30% solids with water and coated at a coating weight of 100–125 mg./dm.$^2$. The coating was dried at 90° C. for 30 seconds, then cured at 120° C. for 4 minutes.

The resulting film was found to be an excellent drafting film for all drafting instruments. The side containing only silica as the toothing agent provided a suitable surface for drafting pencils of 6H to 9H grade which produced sharp lines of good density with no evidence of abrasion, breakthrough or scribing. The surface coated with the mixture of barium sulfate and porous silica was excellent for drafting pencils of 6H grade or softer and offered a good surface for drawing ink lines with a drafting pen with no indication of flaking of the dried inked lines nor did the drafting pens show excessive wear from being used on such surfaces. In addition the inked lines dried in one-half the time required for inked lines to dry on the surfaces containing barium sulfate alone. The film had excellent transparency which allowed accurate tracing and reproduction. Repeated erasures could be made on either surface with no impairment of the original characteristics of the surfaces to function in the above-described manner.

*Example II*

A drafting film was prepared as described in the first sentence of preceding Example I. After drying the film at 90° C. for 30 seconds, the film was then coated on the opposite side with an aqueous dispersion having the following composition:

| | |
|---|---|
| Guanidine-modified urea-formaldehyde (40% aqueous solution)_____grams__ | 8200 |
| Ethylene glycol_____do____ | 330 |
| Ethyl alcohol_____do____ | 910 |
| Barium sulfate (sp. g. 4.5; hardness of about 3.3; average particle size 2–5 microns)____grams__ | 2120 |
| Highly porous magnesium silicate (sp. g. 2.00 to 2.35; hardness above 4.0; dry bulk dens. 8–12#/ft.$^3$; part. size 2–10 microns)_____grams__ | 1040 |
| Formic acid to adjust pH to 3.0_____do____ | 390 |
| Saponin (10% aqueous)_____do____ | 550 |
| Water to make 45.6% solids_____mils__ | 1780 |

The above mixture was ball-milled for 16 hours, diluted with water to 30% solids and coated at a coating weight of 100–125 mg./dm.$^2$. The coating was dried at 90° C. for 30 seconds, then cured at 120° C. for 4 minutes.

The resulting film was found to have characteristics equal to those of the dual purpose drafting film of Example I in all respects.

*Example III*

Example I was repeated except that in place of the barium sulfate 2000 grams of titanium dioxide were used. A very satisfactory dual purpose drafting film was obtained.

*Example IV*

Example I was repeated except that 472 ml. of a 30% isopropanol solution of the Werner complex of chromic chloride and myristic acid was added to the guanidine-modified urea-formaldehyde resin dispersion containing barium sulfate and porous silicon dioxide mixture. The coated film was dried and cured as described in Example I.

The resulting dual purpose film showed the superior characteristics displayed by the drafting films described above, and, in addition, the presence of the Werner complex improved the receptivity of the surface for ink by eliminating any slight tendency for the ink to spread or feather.

*Example V*

Example IV was repeated except that after the pH was reduced to 3.0 with formic acid, orthophosphoric acid was added to further reduce the pH to 2.6. This was done both to the urea-formaldehyde resin dispersion containing silicon dioxide alone and to the resin dispersion containing the mixture containing barium sulfate and silicon dioxide. The coated film was dried at 90° C. for 30 seconds and then exposed to air at 120° C. for 3 minutes. No further heating or curing was necessary to provide an excellent dual purpose drafting film.

The base film need not be a 4-mil polyethylene terephthalate film as described in the examples but may be composed of other dimensionally stable polyester films which are disclosed in Carothers, U.S. Patent 2,071,250 and Whinfield et al. U.S. Patent 2,465,319 bearing a thin layer of an adherent film forming essentially hydrophobic copolymer as disclosed in U.S. Patent 2,627,088 and in U.S. Patent 2,779,684 and the patents referred to in these patents. Other polyester supports are the polyethylene terephthalate/isophthalates of British Patent 766,290 and Canadian Patent 562,672 and those obtainable by condensing terephthalic acid or dimethyl terephthalate with propylene glycol, diethylene glycol, tetramethylene glycol or cyclohexane-1,4-dimethanol (hexahydro-p-xylene alcohol).

Variations can be made in the surface characteristics of the novel drafting films by varying the compositions of the aqueous dispersions described in the above examples since the dispersions are usually stable over a wide range of composition, particularly variations in solid content.

The invention offers a simple and practical means of providing a highly versatile dual purpose drafting film having good transparency and good resistance to all grades of drafting pencils. It offers in one and the same film a surface suitable for extremely hard pencils and a surface which is non-wearing to drafting pens and quick-drying for inked lines which have little or no tendency to flake off. It provides an economical means of manufacture. The drawing surface coating can be applied from an aqueous medium.

An important advantage of the novel drafting films of the invention in addition to their versatility is that they are flexible but do not tend to crease or become torn at the corners. They are durable and do not deteriorate upon aging and retain their excellent stability even when subjected to fairly wide changes in temperature and relative humidity. The toothing coats are flexible while having excellent drafting surfaces, are resistant to abrasion and do not become brittle or rub-off during rough handling. Other advantages are that the drafting films are dimensionally stable, durable and economical to manufacture. Still further advantages will be apparent from the above description of the invention.

This application is a continuation-in-part of application Ser. No. 857,503, filed December 7, 1959, entitled "Coated Films," now abandoned.

What is claimed is:

1. A drafting film comprising (1) a macromolecular organic polymer film base from 3 to 10 mils in thickness having on one surface an adherent, thin sublayer from 0.5 to 5 mg./dm.$^2$, dry weight, of a hydrophobic organic copolymer, said copolymer coated film base exhibiting a shrinkage of not more than 0.2% when heated to a temperature of 120° C. for a period of 5 minutes, (2) on one sublayer a drafting layer composed of a water-soluble organic polymer of high molecular weight and capable of forming a coherent hard film having uniformly dispersed therethrough a mixture of finely divided particles of two toothing agents, at least 60% by weight of said particles being one of said agents having a specific gravity greater than 2.7, a hardness below 4.0 and a particle size from 0.1 to 10.0 microns, and at least 10% of the particles being the other agent said other agent being porous, having a specific gravity less than 2.5, a hardness above 4.0 and a particle size from 0.1 to 10.0 microns and being a member taken from the group consisting of porous silicon dioxide and porous magnesium silicate, and (3) on the other sublayer a drafting layer of different characteristics from layer (2) and comprising finely divided particles of a toothing agent, having a hardness from 4.0 to about 8.0 and a particle size from about 0.1 to 10.0 microns dispersed in the aforesaid water-soluble organic polymer.

2. A drafting film according to claim 1 wherein each said drafting layer contains a plasticizing agent.

3. A drafting film according to claim 1 wherein said macromolecular organic polymer film base is a polycarboxylic acid ester film base.

4. A drafting film according to claim 1 wherein said macromolecular organic polymer film base is a polyethylene polyterephthalate film base.

5. A drafting film as defined in claim 1 wherein said macromolecular organic polymer film base is a polyethylene polyterephthalate film base and said hydrophobic copolymer is a vinylidene chloride/acrylic ester/itaconic acid copolymer containing said components in the respective percentages, by weight, of 35 to 96, 3.5 to 64.5 and 0.5 to 25.0.

6. A drafting film as defined in claim 1 wherein the water-soluble organic polymer is a water-soluble resin taken from the group consisting of urea-formaldehyde, thiourea-formaldehyde, and melamine-formaldehyde resins and their cationic-modified, aliphatic mono- and polyamine-modified and guanidine-modified forms and each drafting layer contains a liquid glycol plasticizing agent for said resin.

7. A drafting film as defined in claim 6 wherein one drafting layer contains silica particles as the toothing agent and the other contains a mixture of barium sulfate and porous silicon dioxide particles as the toothing agent.

8. A drafting film as defined in claim 6 wherein one drafting layer contains silica particles as the toothing agent and the other contains a mixture of barium sulfate and porous magnesium silicate as the toothing agent.

References Cited in the file of this patent

UNITED STATES PATENTS 2,964,423     Van Stappen _____ Dec. 13, 1960